United States Patent
Davenport (10) Patent No.: US 6,491,794 B2
(45) Date of Patent: Dec. 10, 2002

(54) BASE STRUCTURE FOR SEAMED PAPERMAKER'S FABRICS

(75) Inventor: Francis L. Davenport, Ballston Lake, NY (US)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 09/821,925

(22) Filed: Mar. 29, 2001

(65) Prior Publication Data

US 2002/0139503 A1 Oct. 3, 2002

(51) Int. Cl.[7] .............................. B32B 31/02; D03D 3/04
(52) U.S. Cl. .................... 162/358.2; 162/900; 162/904; 139/383 AA; 428/193; 28/110
(58) Field of Search .............................. 162/205, 206, 162/358.1, 358.2, 358.4, 900, 901, 902, 903, 904, 306; 139/383 A, 425 A, 383 AA; 428/57, 111–113, 114, 192, 193; 442/327, 333, 334, 361, 366, 381, 402, 409, 414, 415, 416; 28/110

(56) References Cited

U.S. PATENT DOCUMENTS

| | | | | |
|---|---|---|---|---|
| 3,097,413 A | * | 7/1963 | Draper, Jr. .................... 34/95 |
| 4,119,753 A | * | 10/1978 | Smart .......................... 442/187 |
| 4,427,734 A | | 1/1984 | Johnson ....................... 428/234 |
| 4,467,839 A | * | 8/1984 | Westhead ............... 139/383 A |
| 5,360,656 A | * | 11/1994 | Rexfelt et al. .............. 428/193 |
| 5,785,818 A | * | 7/1998 | Fekete et al. ............ 162/358.2 |
| 6,162,518 A | * | 12/2000 | Korfer .......................... 428/60 |

* cited by examiner

Primary Examiner—Steven P. Griffin
Assistant Examiner—Eric Hug
(74) Attorney, Agent, or Firm—Frommer Lawrence & Haug LLP; Ronald R. Santucci (57) ABSTRACT

An on-machine-seamable papermaker's fabric has a base structure which is a flattened array of a spirally wound multicomponent yarn. The flattened array has two layers, two sides, a length, a width and two widthwise edges. In each turn of the spiral winding, the multicomponent yarn has a substantially lengthwise orientation and is joined side-by-side to those adjacent thereto by a fusible thermoplastic material in each of the two layers. The multicomponent yarn forms seaming loops along the two widthwise edges. At least one layer of staple fiber material is needled into one of the two sides of the base structure and through the two layers.

30 Claims, 4 Drawing Sheets

BASE STRUCTURE FOR SEAMED PAPERMAKER'S FABRICS

BACKGROUND OF THE INVENTION

1. Field of the Invention

The present invention relates to the papermaking arts. More specifically, the present invention relates to press fabrics for the press section of a paper machine.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

The present invention relates specifically to the press fabrics used in the press section. Press fabrics play a critical role during the paper manufacturing process. One of their functions, as implied above, is to support and to carry the paper product being manufactured through the press nips.

Press fabrics also participate in the finishing of the surface of the paper sheet. That is, press fabrics are designed to have smooth surfaces and uniformly resilient structures, so that, in the course of passing through the press nips, a smooth, mark-free surface is imparted to the paper.

Perhaps most importantly, the press fabrics accept the large quantities of water extracted from the wet paper in the press nip. In order to fill this function, there literally must be space, commonly referred to as void volume, within the press fabric for the water to go, and the fabric must have adequate permeability to water for its entire useful life. Finally, press fabrics must be able to prevent the water accepted from the wet paper from returning to and rewetting the paper upon exit from the press nip.

Contemporary press fabrics are produced in a wide variety of styles designed to meet the requirements of the paper machines on which they are installed for the paper grades being manufactured. Generally, they comprise a woven base fabric into which has been needled a batt of fine, nonwoven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a papermachine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing one base fabric within the endless loop formed by another, and by needling a staple fiber batt through both base fabrics to join them to one another. One or both woven base fabrics may be of the on-machine-seamable type.

In any event, the woven base fabrics are in the form of endless loops, or are seamable into such forms, having a specific length, measured longitudinally therearound, and a specific width, measured transversely thereacross. Because paper machine configurations vary widely, paper machine clothing manufacturers are required to produce press fabrics, and other paper machine clothing, to the dimensions required to fit particular positions in the paper machines of their customers. Needless to say, this requirement makes it difficult to streamline the manufacturing process, as each press fabric must typically be made to order.

In response to this need to produce press fabrics in a variety of lengths and widths more quickly and efficiently, press fabrics have been produced in recent years using a spiral technique disclosed in commonly assigned U.S. Pat. No. 5,360,656 to Rexfelt et al., the teachings of which are incorporated herein by reference.

U.S. Pat. No. 5,360,656 shows a press fabric comprising a base fabric having one or more layers of staple fiber material needled thereinto. The base fabric comprises at least one layer composed of a spirally wound strip of woven fabric having a width which is smaller than the width of the base fabric. The base fabric is endless in the longitudinal, or machine, direction. Lengthwise threads of the spirally wound strip make an angle with the longitudinal direction of the press fabric. The strip of woven fabric may be flat-woven on a loom which is narrower than those typically used in the production of paper machine clothing.

The base fabric comprises a plurality of spirally wound and joined turns of the relatively narrow woven fabric strip. The fabric strip is woven from lengthwise (warp) and crosswise (filling) yarns. Adjacent turns of the spirally wound fabric strip may be abutted against one another, and the helically continuous seam so produced may be closed by sewing, stitching, melting or welding. Alternatively, adjacent longitudinal edge portions of adjoining spiral turns may be arranged overlappingly, so long as the edges have a reduced thickness, so as not to give rise to an increased thickness in the area of the overlap. Further, the spacing between lengthwise yarns may be increased at the edges of the strip, so that, when adjoining spiral turns are arranged overlappingly, there may be an unchanged spacing between lengthwise threads in the area of the overlap.

In any case, a woven base fabric, taking the form of an endless loop and having an inner surface, a longitudinal (machine) direction and a transverse (cross-machine) direction, is the result. The lateral edges of the woven base fabric are then trimmed to render them parallel to its longitudinal (machine) direction. The angle between the machine direction of the woven base fabric and the helically continuous seam may be relatively small, that is, typically less than 10°. By the same token, the lengthwise (warp) yarns of the woven fabric strip make the same relatively small angle with the longitudinal (machine) direction of the woven base fabric. Similarly, the crosswise (filling) yarns of the woven fabric strip, being perpendicular to the lengthwise (warp) yarns, make the same relatively small angle with the transverse (cross-machine) direction of the woven base fabric. In short, neither the lengthwise (warp) nor the crosswise (filling) yarns of the woven fabric strip align with the longitudinal (machine) or transverse (cross-machine) directions of the woven base fabric.

In the method shown in U.S. Pat. No. 5,360,656, the woven fabric strip is wound around two parallel rolls to assemble the woven base fabric. It will be recognized that endless base fabrics in a variety of widths and lengths may be provided by spirally winding a relatively narrow piece of woven fabric-strip around the two parallel rolls, the length of a particular endless base fabric being determined by the length of each spiral turn of the woven fabric strip, and the width being determined by the number of spiral turns of the woven fabric strip. The prior necessity of weaving complete base fabrics of specified lengths and widths to order may thereby be avoided. Instead, a loom as narrow as 20 inches (0.5 meters) could be used to produce a woven fabric strip, but, for reasons of practicality, a conventional textile loom having a width of from 40 to 60 inches (1.0 to 1.5 meters) may be preferred.

Those of ordinary skill in the art will immediately recognize, however, that the press fabrics shown in U.S. Pat. No. 5,360,656 are available only in endless form. As a consequence, their use has been limited to press sections having cantilevered press rolls and other components, which permit an endless press fabric to be installed from the side of the press section.

Accordingly, there remains a need for an on-machine-seamable press fabric, which, like the press fabrics shown in U.S. Pat. No. 5,360,656, does not require the weaving of a complete base fabric having a length and a width specified by the papermaker. That need is met by the present invention.

SUMMARY OF THE INVENTION

The present invention, therefore, is an on-machine-seamable papermaker's fabric which includes an unwoven on-machine-seamable base structure.

In its broadest form, the base structure is an array formed by spirally winding a multicomponent yarn in a plurality of abutting, non-overlapping turns. The multicomponent yarn has a plurality of individual yarn strands and at least one thermofusible strand of a thermoplastic material having a melting point lower than that of the individual yarn strands. Alternatively, the multicomponent yarn has a plurality of individual yarn strands and a coating of a thermoplastic material having a melting point lower than that of the individual yarn strands.

When the multicomponent yarn is spirally wound to a desired width, portions of the array are exposed to heat at a temperature sufficient to melt the at least one thermofusible strand or coating, but not the other individual yarn strands, of the multicomponent yarn. The fused thermoplastic material of the thermofusible strand, strands or coating flows between adjacent turns of the multicomponent yarns in the array. When the fused thermoplastic material is allowed to solidify, it joins the adjacent multicomponent yarns to one another in a side-by-side manner.

The array of multicomponent yarns is flattened, and, as such, has two layers, two sides, a length, a width and two widthwise edges. The multicomponent yarn in each of the plurality of turns has a substantially lengthwise orientation in each of the two layers. Along the two widthwise edges of the flattened array are a plurality of seaming loops formed by the multicomponent yarn. The seaming loops, preferably, are formed by every other turn of the multicomponent yarn.

At least one layer of staple fiber material is needled into one of the two sides of the base structure and through the two layers.

The present invention will now be described in more complete detail, with frequent reference being made to the figures identified below.

DETAILED DESCRIPTION OF THE PREFERRED EMBODIMENT

Figure 1:
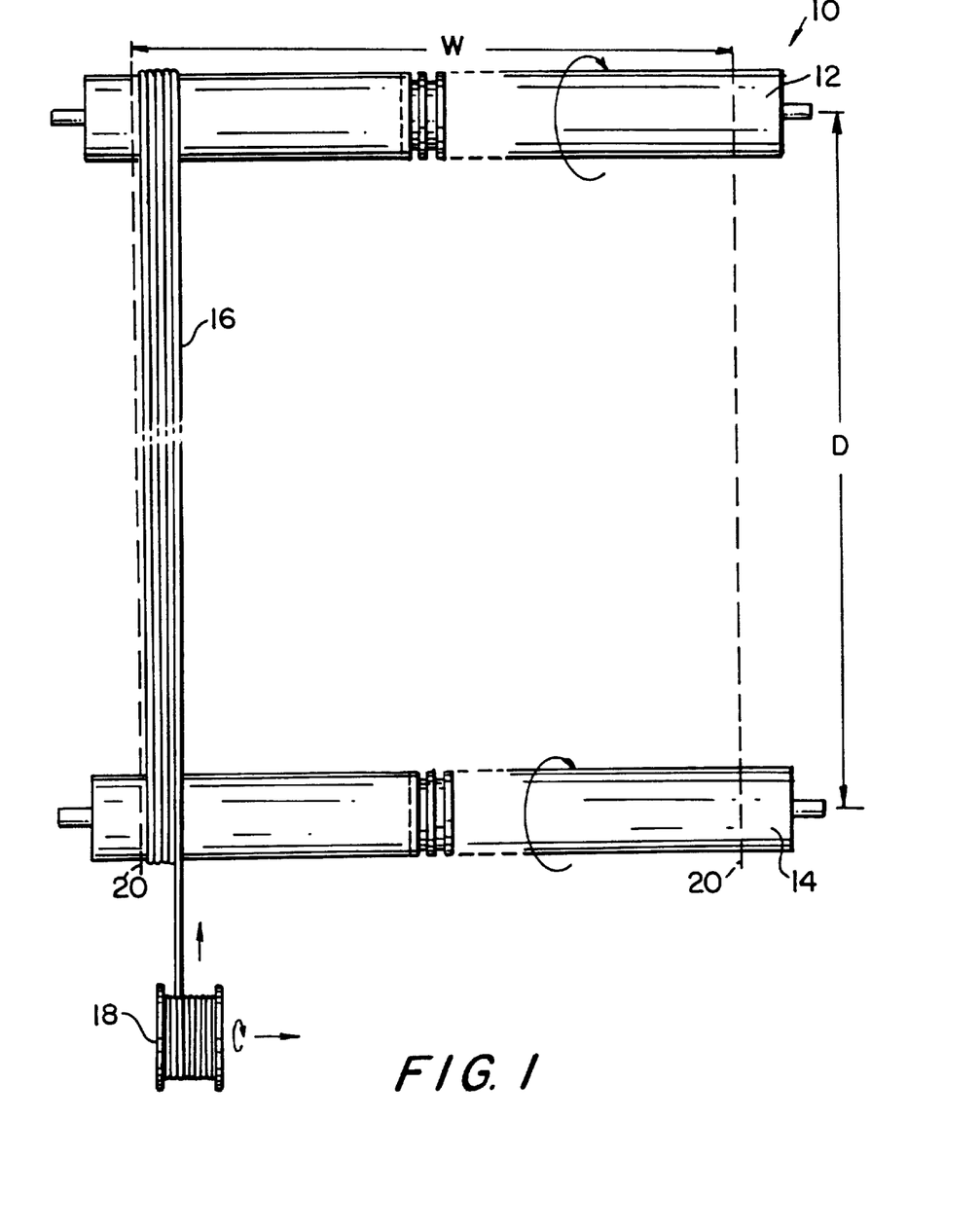
FIG. 1 is a schematic top plan view of an apparatus used to manufacture the base structure.

Referring now to these figures, FIG. 1 is a schematic top plan view illustrating a method for manufacturing the base structure for seamed papermaker's fabrics in accordance with the teachings of the present invention. The method may be practiced using an apparatus 10 comprising a first roll 12 and a second roll 14, which are parallel to one another and which may be rotated in the directions indicated by the arrows in FIG. 1. A multicomponent yarn 16 is wound from a stock roll 18 around the first roll 12 and the second roll 14 in a continuous spiral. One of ordinary skill in the art will recognize at once that it will be necessary to translate the stock roll 18 at a suitable rate along second roll 14 (to the right in FIG. 1) as the multicomponent yarn 16 is being wound around the rolls 12,14.

The first roll 12 and the second roll 14 are separated by a distance, D, which is determined with reference to the total length required for the base structure being manufactured, that total length being one half that of the endless loop being formed by winding multicomponent yarns 16 about the first roll 12 and the second roll 14. Multicomponent yarn 16 is spirally wound onto the first roll 12 and second roll 14 in a plurality of turns from stock roll 18, which is translated along the second roll 14 in the course of the winding.

Figure 2:
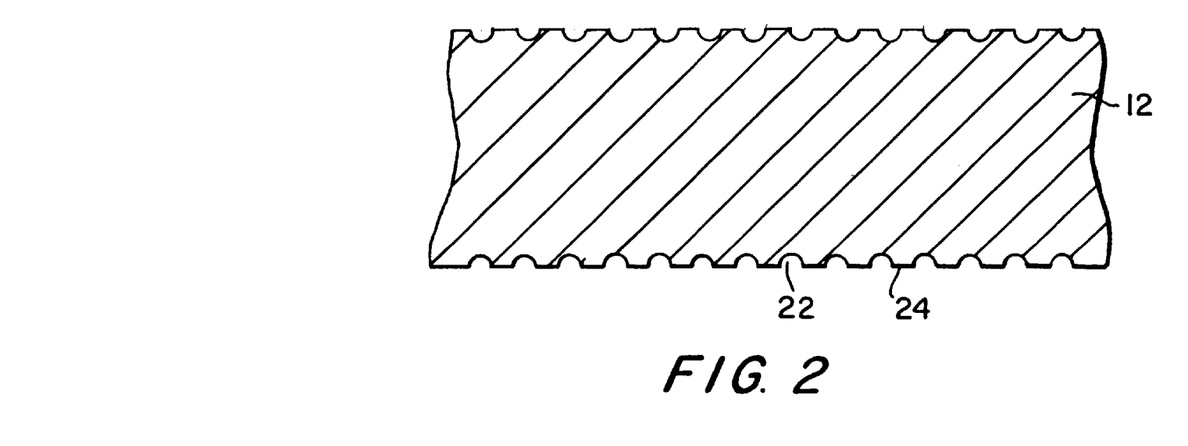
FIG. 2 is a cross-sectional view taken longitudinally through one of the rolls of the apparatus.

First roll 12 and second roll 14 are both grooved. Alternate turns of the multicomponent yarn 16 are disposed in the grooves or in the land areas separating the grooves. Reference is made to FIG. 2, which is a cross-sectional view taken longitudinally through first roll 12. Grooves 22 and land areas 24, those portions of the surface of the first and second rolls 12,14 separating the grooves 22, each have the same width, which width is approximately equal to the diameter of the multicomponent yarn 16. The grooves 22 themselves may be quite shallow, and, for the purpose of illustration, have been given an exaggerated depth in FIG. 2. As the multicomponent yarn 16 is wound around the first roll 12 and the second roll 14, it is alternately disposed in a groove 22 or on a land area 24 on each roll 12,14 as the spiral winding proceeds across the rolls 12,14. The spiral winding proceeds until a sufficient number of turns of the multicomponent yarns 16 have been made to cover a desired width, W, on the rolls 12,14, the width, W, being that desired for the base structure being manufactured, as indicated by the lines 20 and the distance therebetween in FIG. 2. Because the grooves 22 and land areas 24 are each approximately the same width (diameter) as the multicomponent yarn 16, the individual lengths of the multicomponent yarn 16 extending across the distance, D, between the first roll 12 and the second roll 14 have a side-by-side abutting relationship with one another.

The multicomponent yarns 16 comprise a plurality of individual yarn strands and at last one thermofusible strand of a thermoplastic material. Alternatively, the multicomponent yarns 16 comprise a plurality of individual yarn strands and a coating of a thermoplastic material. The thermoplastic material of the thermofusible strand or coating has a melting point lower than that of the individual yarn strands in the multicomponent yarn. As a result, upon application of a heat treatment to any given length of the multicomponent yarn at a temperature higher than the melting point of the thermofusible strand or coating but below that of the individual yarn strands, the thermoplastic material melts and flows into the spaces between the individual yarn strands, and, in the present situation, between adjacent lengths of the multicomponent yarns 16. At the conclusion of the heat treatment, the thermoplastic material resolidifies and joins adjacent lengths of multicomponent yarns 16 to one another in a side-by-side configuration.

The multicomponent yarns 16 may be plied monofilament, plied multifilament, multifilament or plied/twisted yarns or combinations thereof. By a plied/twisted yarn is meant any variety of yarn used in the production of paper machine clothing having multiple ends or filaments, which are twisted together to a desired degree, and, in many cases, then combined or plied with other filaments of the same type or of a different type. During the plying operation, the yarn components are combined together by twisting them in a direction opposite to that of the individual components. The plied/twisted yarns may accordingly be considered to be multicomponent yarns. The multicomponent yarns may alternatively be braided or knitted yarns. In any event, the multicomponent yarns include at least one thermofusible strand or are coated with a thermoplastic material.

The individual yarn strands included in he multicomponent yarn 16 are typically of circular cross section, although it should be understood that they may be of any of a variety of other cross-sectional shapes, such as rectangular, oval or multilobed. The multicomponent yarn, produced by ply/twisting, braiding or knitting its components, may have a cross section which is not circular in shape.

The individual yarn strands of the multicomponent yarn 16, other than the thermofusible strand or strands, are extruded from synthetic polymeric resin materials, such as polyamide, polyester, polyetherketone, polypropylene, polyaramid, polyolefin, polyphenylene sulfide (PPS) and polyethylene terephthalate (PET) resins, and copolymers thereof, and incorporated into yarns according to techniques well known in the textile industry and particularly in the paper machine clothing industry.

The thermofusible strand, strands or coating are of a thermoplastic material having a melting point lower than that of the other individual yarn strands making up the multicomponent yarn 16. The thermoplastic material may, for example, be polyamide 66, low-melt polyamide 6 or polyurethane.

As noted above, the multicomponent yarn may include at least one thermofusible strand of the thermoplastic material. That is, it may include one, two, three or more thermofusible strands. The thermofusible strand may be monofilament or multifilament either of which may be of non-circular cross-section. It, or they, may be an extruded yarn or a strand cut from a film of the thermoplastic material. It may also be of a strand or strands obtained or cut from a nonwoven material web of polyamide or polyurethane of a low melting temperature. Nonwoven material webs of this type are available from Sharnet.

Where the multicomponent yarn 16 includes a coating of a thermoplastic material, the coating may be applied by dipping, spraying, by an emulsion process, or by cross-heat extrusion.

Alternatively, the multicomponent yarn 16 may comprise a plurality of individual yarn strands of a thermoplastic material called MXD6, a special polyamide resin available from Mitsui in Japan. When subjected to a heat treatment at an appropriate temperature, the outside of such a multicomponent yarn 16 melts and flows, but the heat treatment does not cause the yarn 16 to lose any other textile property, such as strength or elongation.

Figure 3:
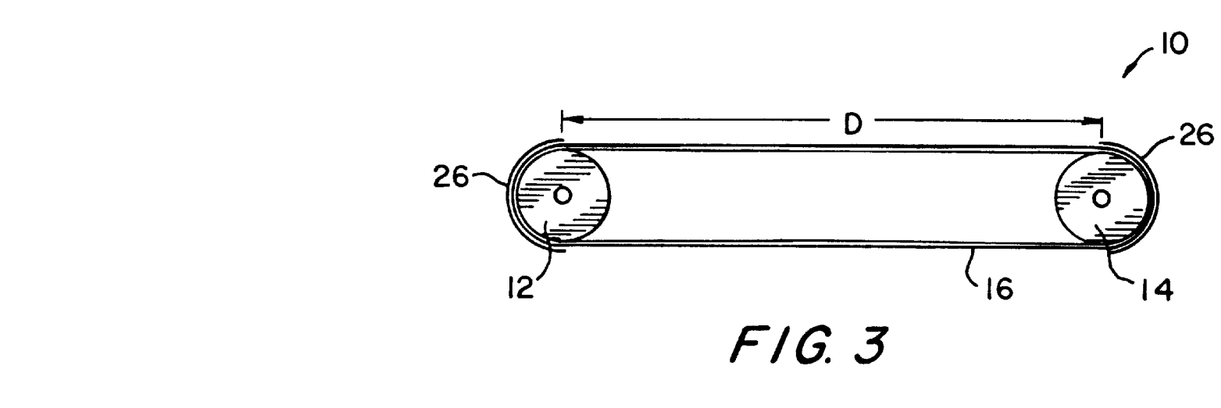
FIG. 3 is a side view of the apparatus shown in FIG. 1.

A side view of the apparatus 10 is provided in FIG. 3. Once multicomponent yarn 16 has been wound around first roll 12 and second roll 14 to a desired width, W, thin strips of insulating material 26, having a width at least equal to W and a length equal to one half of the circumference of first roll 12 and second roll 14, respectively, are applied to the spiralled array of multicomponent yarns 16 on the respective rolls 12,14. The spiralled array of multicomponent yarns 16 is then exposed to heat at a temperature sufficient to melt the thermofusible strand, strands or coating of the multicomponent yarns 16. The thermoplastic material of the thermofusible strand, strands or coating melts and flows between adjacent lengths of the multicomponent yarns 16 extending between the first roll 12 and the second roll 14 and not covered by insulating material 26. Pressure may be applied to assist the flow of molten material. The thermoplastic material is allowed to resolidify and join the adjacent lengths of multicomponent yarn 16 to one another, except for those portions covered by insulating material 26.

Figure 4:
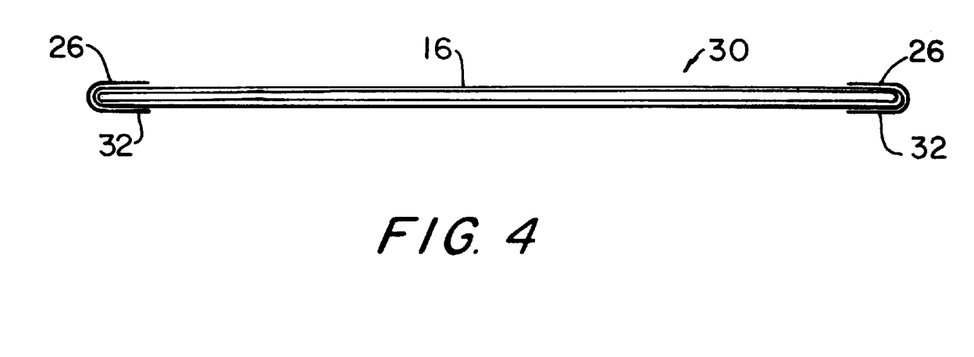
FIG. 4 is a side view of a flattened array of bonded multicomponent yarns following removal from the apparatus.

The resulting array 30 of bonded multicomponent yarns 16 is then removed from apparatus 10 and flattened, as shown in FIG. 4, with thin strips of insulating material 26 holding the sections of multicomponent yarns 16 not subjected to the heat treatment in place at the two ends 32 of the flattened array 30.

Figure 5:
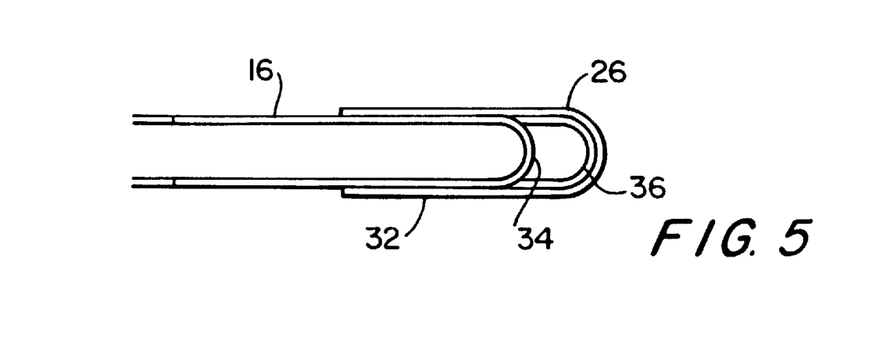
FIG. 5 is an enlarged view of one of the two ends of the array.

FIG. 5 is an enlarged view of one of the two ends 32 of the flattened array 30. Within the thin strips of insulating material 26, the spirally wound multicomponent yarn 16 forms a series of loops. Every other loop 34 is shorter than those on either side, loops 36, because the first roll 12 and second roll 14 were grooved, the shorter loops 34 resulting from those turns of multicomponent yarn 16 which were disposed in grooves 22. The longer loops 36 result from those turns of multicomponent yarn 16 which resided on land areas 24.

Figure 6:
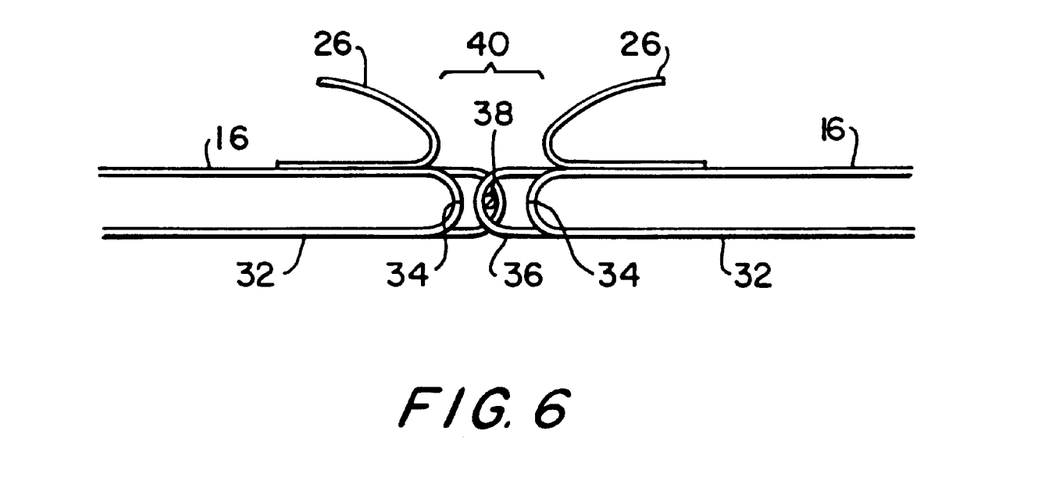
FIG. 6 is an enlarged view of the two ends of the array joined to one another.

The flattened array 30 of bonded multicomponent yarns 16 is then folded and the two ends 32 brought together. Thin strips of insulating material 26 are peeled back to expose loops 34,36 and loops 36 of the two ends 32 are interdigitated with one another. Pintle 38 is then directed through the passage formed by the interdigitated loops 36 to join ends 32 to one another at seam 40, as shown in FIG. 6.

Figure 7:
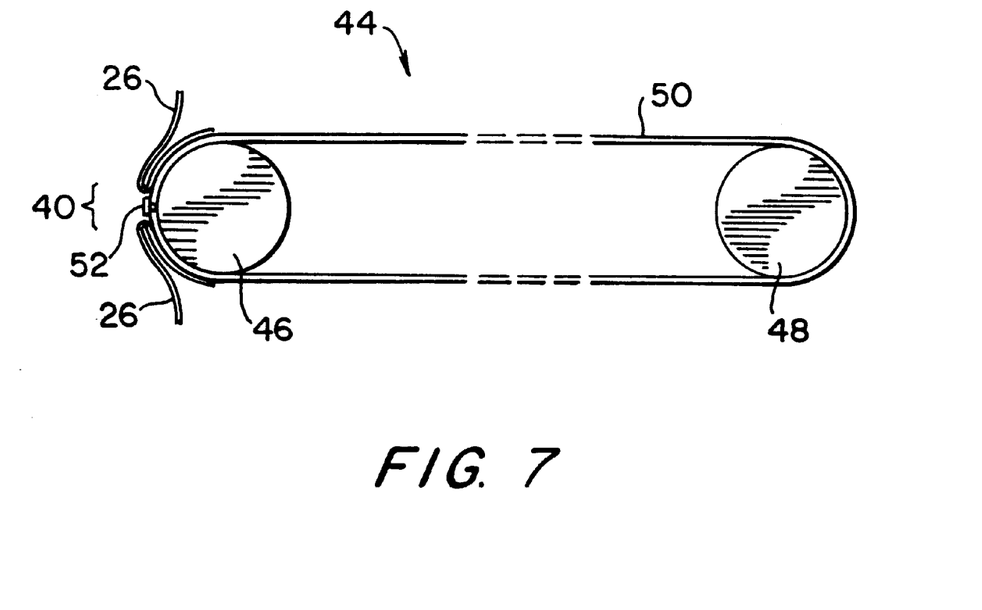
FIG. 7 is a side view of the base structure on a needle loom.

The on-machine-seamable base structure 50 thereby obtained is then mounted on a needle loom 44 and placed under tension. The seam 40 is disposed on one of the two rolls 46,48 of the needle loom 44, as shown in FIG. 7. A thin strip of insulating material 52 having a width at least equal to W and a length sufficient to cover the seam 40, perhaps approximately 0.25 inches.

One at a time, thin strips of insulating material 26 are removed from either side of the seam 40 and the underlying multicomponent yarns 16 exposed to heat at a temperature sufficient to melt the thermofusible strand, strands or coating of the multicomponent yarns 16. As before, the thermoplastic material of the thermofusible strand, strands or coating melts and flows between adjacent lengths of the multicomponent yarns 16 on roll 46. The thermoplastic material is allowed to resolidify and join the adjacent lengths of multicomponent yarn 16 on the roll 46 to one another. Thin strip of insulating material 52 prevents the thermofusible strand, strands or coating of multicomponent yarn 16 at loops 36 from melting.

Thin strip of insulating material 52 is then removed from the seam 40, and the base structure 50 is then needled on one or both of its inner and outer surfaces with one or more layers of staple fiber material.

During the needling process, the base structure 50 may be laminated with other structures, such as endless woven base fabrics, apertured thermoplastic polyurethane sheet material, and nonwoven mesh materials, such as those disclosed in commonly assigned U.S. Pat. No. 4,427,734 to Johnson, the teachings of which are incorporated herein by reference. In such cases, the additional structure or structures are joined to the base structure 50 by individual fibers of the one or more layers of staple fiber material driven therethrough by the needling.

Following the needling process, pintle 38 is removed to separate loops 36 at the two ends 32 of the base structure 50 from one another. Temporary protective pintles are then inserted through the passages formed by the uninterdigitated loops 36 at the two ends 32 of the base structure 50 to keep the geometry of the loops intact during shipment. The staple fiber material at the seam 40 is then cut to place the on-machine-seamable press fabric comprising on-machine-seamable base structure 50 and staple fiber material into open-ended form for shipment to a customer.

During installation on a paper machine, the temporary protective pintles are removed and loops 36 are again interdigitated and a permanent pintle inserted through the passage formed by the interdigitated loops 36 to join the on-machine-seamable press fabric into endless form on the paper machine. A heat treatment can then be given to the seam 40 at a temperature sufficient to melt the thermofusible strand, strands or coating of the multicomponent yarns 16 forming loops 36 to give the seam 40 characteristics similar to those of the rest of the on-machine-seamable base structure 50.

The base structure 50 produced in accordance with the teachings of the present invention, in its simplest form, has two layers, each comprising lengthwise yarns joined side-by-side to one another as a result of the heat treatment. In this simplest form, the pintle will make the seam 40 slightly thicker than the rest of the fabric. With proper pintle design, this difference can be minimized.

In an alternate embodiment of the present invention, however, a layer of nonwoven mesh material, such as that disclosed in the above-mentioned U.S. Pat. No. 4,427,734, is inserted within the array 30 of bonded multicomponent yarns 16 upon its removal from apparatus 10 and subsequent flattening, as shown in FIG. 4. The array 30 of bonded multicomponent yarns 16 is then processed in the same manner as that described above to produce a base structure having an intermediate layer of nonwoven mesh material. The pintle used to close the on-machine-seamable press fabric incorporating the base structure can be chosen to have the same thickness as the nonwoven mesh material, so that the press fabric as a whole, seam included, will have a uniform thickness.

In addition to providing additional thickness to the base structure, the nonwoven mesh material provides additional void volume therewithin for the temporary storage of water pressed from a paper sheet in the press section of a paper machine. It should be understood, in this regard, that a woven mesh fabric would be just as suitable for this purpose, as the nonwoven mesh material of U.S. Pat. No. 4,427,734.

In still another embodiment of the present invention, a pair of yarns, rather than one multicomponent yarn 16, is spirally wound around first roll 12 and second roll 14. One of the yarns is the multicomponent yarn 16 described at length above. The other is a solvent-removable yarn. Suitable materials for the production of the solvent-removable yarn are polyvinyl alcohol and calcium alginate, both of which are soluble in water. Alternatively, certain uncured polymeric resin materials, such as uncured acrylics, are soluble in warm water, and may be used to produce the solvent-removable yarn, which may be either a monofilament or a multicomponent yarn.

In the course of the spiral winding onto apparatus 10, multicomponent yarn 16 is always disposed on the land areas 24 on the first and second rolls 12,14, while the solvent-removable yarn is always disposed in the grooves 22. With this modification, the spiral winding proceeds as above until the desired width, W, is reached.

Manufacture proceeds as previously described up to the point where, following the needling process, the on-machine-seamable press fabric so produced is to be placed into open-ended form for shipment to a customer. At this point, the needled fabric is given a water bath, for a sufficient time and at a sufficient temperature, to dissolve the solven-tremovable yarn. Once the solvent-removable yarn has been completely removed, the fabric is dried and prepared for shipment in the previously described manner. Installation on the press section of a paper machine also proceeds as described above. The use of the solvent-removable yarn ensures that the base structure will be more open and permeable.

The present invention offers several benefits over the practices of the prior art. Clearly, with the present invention it is not necessary to weave a full-size fabric. Moreover, because the base structure is not woven, the press fabric is planar and has no yarn knuckles. There are no cross-machine-direction (CD) yarns to unravel to form the loops required for seaming, yet the base structure has CD stability because the machine-direction (MD) yarns are bonded side-by-side to one another. The cost to produce a multilayer structure in accordance with the present invention is less than that of the prior-art woven structures. Finally, the Z-direction compressibility, openness and void volume of the base structure can be controlled by preselecting the number of thermofusible strands in the multicomponent yarn.

Modifications to the above would be obvious to those of ordinary skill in the art, but would not bring the invention so modified beyond the scope of the appended claims.

What is claimed is:

1. An on machine-seamable papermaker's fabric comprising:
    an on-machine-seamable base structure, said structure being a flattened array of a plurality of turns of a spirally wound, non-overlapping multicomponent yarn having a plurality of individual yarn strands, said flattened array having two layers, two sides, a length, a width and two widthwise edges, said multicomponent yarn in each of said plurality of turns having a substantially lengthwise orientation in each of said two layers and forming a plurality of seaming loops along each of said two widthwise edges, said multicomponent yarn in each of said plurality of turns being joined side-by-side to those adjacent thereto in said two layers by a fusible thermoplastic material; and
    at least one layer of staple fiber material needled into one of said two sides of said base structure and through said two layers.

2. An on-machine-seamable papermaker's fabric as claimed in claim 1 further comprising a third layer between said two layers of said flattened array, said third layer being of a nonwoven mesh material.

3. An on-machine-seamable papermaker's fabric as claimed in claimed 1 wherein said multicomponent yarn is a plied monofilament yarn.

4. An on-machine-seamable papermaker's fabric as claimed in claim 1 wherein said multicomponent yarn is a plied multifilament yarn.

5. An on-machine-seamable papermaker's fabric as claimed in claim 1 wherein said multicomponent yarn is a multifilament yarn.

6. An on-machine-seamable papermaker's fabric as claimed in claim 1 wherein said multicomponent yarn is a plied/twisted yarn.

7. An on-machine-seamable papermaker's fabric as claimed in claim 1 wherein said multicomponent yarn is a yarn selected from the group consisting of plied monofilament yarns, plied multifilament yarns, multifilament yarns, plied/twisted yarns and combinations thereof.

8. An on-machine-seamable papermaker's fabric as claimed in claim 1 wherein said multicomponent yarn is a knitted yarn.

9. An on-machine-seamable papermaker's fabric as claimed in claim 1 wherein said multicomponent yarn is a braided yarn.

10. An on-machine-seamable papermaker's fabric as claimed in claim 1 wherein individual yarn strands of said multicomponent yarn are extruded from a polymeric resin material.

11. An on-machine-seamable papermaker's fabric as claimed in claim 10 wherein said polymeric resin material is selected from the group consisting of polyamide, polyester, polyetherketone, polypropylene, polyaramid, polyolefin, polyphenylene sulfide (PPS) and polyethylene terephthalate (PET) resins, and copolymers thereof, and MXD6 polyamide resin.

12. An on-machine-seamable papermaker's fabric as claimed in claim 1 wherein said fusible thermoplastic material is selected from the group consisting of polyamide 66, low-melt polyamide 6, polyurethane and MXD6 polyamide resin.

13. An on-machine-seamable papermaker's fabric comprising:
    an on-machine-seamable base structure, said structure being a flattened array of a plurality of turns of a spirally wound, non-overlapping multicomponent yarn having a plurality of individual yarn strands, said flattened array having two layers, two sides, a length, a width and two widthwise edges, said multicomponent yarn in each of said plurality of turns having a substantially lengthwise orientation in each of said two layers and forming a plurality of seaming loops along each of said two widthwise edges, said multicomponent yarn in each of said plurality of turns being joined side-by-side to those adjacent thereto in said two layers by a fusible thermoplastic material;
    at least one layer of staple fiber material needled into one of said two sides of said base structure and through said two layers; and
    wherein every other one of said plurality of turns of said multicomponent yarn forms a seaming loop along each of said two widthwise edges.

14. An intermediate on-machine-seamable papermaker's fabric comprising:
    an on-machine-seamable base structure, said structure being a flattened array of a plurality of turns of spirally wound, non-overlapping yarns, said yarns including a multicomponent yarn having a plurality of individual yarn strands and a solvent-removable yarn, said flattened array having two layers, two sides, a length, a width and two widthwise edges, said yarns in each of said plurality of turns having a substantially lengthwise orientation in each of said two layers, said multicomponent yarn forming a plurality of seaming loops along each of said two widthwise edges, said yarns in each of said plurality of turns being joined side-by-side to those adjacent thereto in said two layers by a fusible thermoplastic material; and
    at least one layer of staple fiber material needled into one of said two sides of said base structure and through said two layers.

15. An on-machine-seamable papermaker's fabric as claimed in claim 14 further comprising a third layer between said two layers of said flattened array, said third layer being of a nonwoven mesh material.

16. An on-machine-seamable papermaker's fabric as claimed in claimed 14 wherein said multicomponent yarn is a plied monofilament yarn.

17. An on-machine-seamable papermaker's fabric as claimed in claim 14 wherein said multicomponent yarn is a plied multifilament yarn.

18. An on-machine-seamable papermaker's fabric as claimed in claim 14 wherein said multicomponent yarn is a multifilament yarn.

19. An on-machine-seamable papermaker's fabric as claimed in claim 14 wherein said multicomponent yarn is a plied/twisted yarn.

20. An on-machine-seamable papermaker's fabric as claimed in claim 14 wherein said multicomponent yarn is a yarn selected from the group consisting of plied monofilament yarns, plied multifilament yarns, multifilament yarns, plied/twisted yarns and combinations thereof.

21. An on-machine-seamable papermaker's fabric as claimed in claim 14 wherein said multicomponent yarn is a knitted yarn.

22. An on-machine-seamable papermaker's fabric as claimed in claim 14 wherein said multicomponent yarn is a braided yarn.

23. An on-machine-seamable papermaker's fabric as claimed in claim 14 wherein individual yarn strands of said multicomponent yarn are extruded from a polymeric resin material.

24. An on-machine-seamable papermaker's fabric as claimed in claim 23 wherein said polymeric resin material is selected from the group consisting of polyamide, polyester, polyetherketone, polypropylene, polyaramid, polyolefin, polyphenylene sulfide (PPS) and polyethylene terephthalate (PET) resins, and copolymers thereof, and MXD6 polyamide resin.

25. An on-machine-seamable papermaker's fabric as claimed in claim 14 wherein said fusible thermoplastic material is selected from the group consisting of polyamide 66, low-melt polyamide 6, polyurethane and MXD6 polyamide resin.

26. An on-machine-seamable papermaker's fabric as claimed in claim 14 wherein said solvent-removable yarn is soluble in a particular solvent not affecting said multicomponent yarn.

27. An on-machine-seamable papermaker's fabric as claimed in claim 14 wherein said solvent-removable yarn is a monofilament yarn.

28. An on-machine-seamable papermaker's fabric as claimed in claim 14 wherein said solvent-removable yarn is a multicomponent yarn.

29. An on-machine-seamable papermaker's fabric as claimed in claim 14 wherein said solvent-removable yarn is of a material selected from the group consisting of polyvinyl alcohol, calcium alginate and uncured acrylic, and wherein said particular solvent is water.

30. An on-machine-seamable papermaker's fabric comprising:

an on-machine-seamable base structure, said structure being a flattened array of a plurality of turns of spirally wound, non-overlapping yarns, said yarns including a multicomponent yarn having a plurality of individual yarn strands and a solvent-removable yarn, said flattened array having two layers, two sides, a length, a width and two widthwise edges, said yarns in each of said plurality of turns having a substantially lengthwise orientation in each of said two layers, said multicomponent yarn forming a plurality of seaming loops along each of said two widthwise edges, said yarns in each of said plurality of turns being joined side-by-side to those adjacent thereto in said two layers by a fusible thermoplastic material;

at least one layer of staple fiber material needled into one of said two sides of said base structure and through said two layers; and wherein every other one of said plurality of turns of said yarns is a multicomponent yarn which forms a seaming loop along each of said two widthwise edges.

* * * * *